US009222679B2

United States Patent
Takeshita et al.

(10) Patent No.: US 9,222,679 B2
(45) Date of Patent: Dec. 29, 2015

(54) EARTHQUAKE RESISTING APPARATUS

(71) Applicants: Masami Takeshita, Ibaraki (JP);
Masahiro Yamazaki, Ibaraki (JP);
Kazuhiro Shimojima, Ibaraki (JP);
Yuuki Kikushima, Kanagawa (JP)

(72) Inventors: Masami Takeshita, Ibaraki (JP);
Masahiro Yamazaki, Ibaraki (JP);
Kazuhiro Shimojima, Ibaraki (JP);
Yuuki Kikushima, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 121 days.

(21) Appl. No.: 13/739,324

(22) Filed: Jan. 11, 2013

(65) Prior Publication Data

US 2013/0180187 A1 Jul. 18, 2013

(30) Foreign Application Priority Data

Jan. 16, 2012 (JP) ................................. 2012-005877
Nov. 1, 2012 (JP) ................................. 2012-241667

(51) Int. Cl.
| | |
|---|---|
| *F16M 11/00* | (2006.01) |
| *F24C 15/08* | (2006.01) |
| *F16M 13/00* | (2006.01) |
| *B41J 29/08* | (2006.01) |

(Continued)

(52) U.S. Cl.
CPC ................ *F24C 15/083* (2013.01); *B41J 29/08* (2013.01); *E04B 1/98* (2013.01); *E04H 9/022* (2013.01); *F16M 7/00* (2013.01); *F16M 13/00* (2013.01); *A47B 21/0314* (2013.01); *A47B 2097/008* (2013.01)

(58) Field of Classification Search
CPC .......... E04B 1/98; F16M 13/00; F16M 11/00;
A47B 21/0314; A47B 2097/008; F24C 15/083; B41J 29/08; F16F 1/36; F16B 21/00; E02D 27/34; E04H 9/022
USPC ......... 248/680, 633, 678, 681, 346.01, 177.1;
52/167.8, 167.4, 167.1, 167.7, 167.9
See application file for complete search history.

(56) References Cited

U.S. PATENT DOCUMENTS 3,219,362 A * 11/1965 Epstein ...................... 280/763.1
4,066,234 A * 1/1978 Nycum ......................... 248/558

(Continued)

FOREIGN PATENT DOCUMENTS

| | | |
|---|---|---|
| CN | 2012-22356 Y | 4/2009 |
| JP | 09-158984 | 6/1997 |

(Continued)

OTHER PUBLICATIONS

Chinese Office action dated Sep. 24, 2014 and issued in Chinese Patent Application No. 201310016015.2.

*Primary Examiner* — Anita M King
(74) *Attorney, Agent, or Firm* — Harness, Dickey & Pierce, P.L.C.

(57) ABSTRACT

An earthquake resisting apparatus includes a load transmitting member which has a surface area larger than an installation area of an installation object, a movement limiting member which is arranged between the load transmitting member and an installation floor, the movement limiting member being bonded to the load transmitting member and having a coefficient of static friction between the movement limiting member and the installation floor when a load acts on the installation object in a horizontal direction in a state in which the installation object is fixed to the load transmitting member, in which the coefficient is larger than or equal to a predetermined value, and a fastening part which connects the installation object and the earthquake resisting apparatus.

12 Claims, 13 Drawing Sheets

(51) Int. Cl.
*E04H 9/02* (2006.01)
*E04B 1/98* (2006.01)
*F16M 7/00* (2006.01)
*A47B 21/03* (2006.01)
*A47B 97/00* (2006.01)

(56) References Cited

U.S. PATENT DOCUMENTS

| | | | |
|---|---|---|---|
| 5,599,106 A | | 2/1997 | Kemeny |
| 5,699,993 A | * | 12/1997 | Hill et al. ............. 248/680 |
| 5,816,554 A | * | 10/1998 | McCracken ............. 248/346.01 |
| 6,216,991 B1 | * | 4/2001 | Okamoto ............. 248/188.1 |
| 6,427,965 B1 | * | 8/2002 | McCracken ............. 248/633 |
| 6,938,390 B2 | | 9/2005 | Maeda et al. |
| 2002/0162938 A1 | * | 11/2002 | Schauer ............. 248/678 |

FOREIGN PATENT DOCUMENTS

| | | |
|---|---|---|
| JP | 09-193939 | 7/1997 |
| JP | 10-061880 | 3/1998 |
| JP | 10-232527 | 9/1998 |
| JP | 10-252825 | 9/1998 |
| JP | 11-082617 | 3/1999 |
| JP | 2000-145113 | 5/2000 |
| JP | 2002-070945 | 3/2002 |
| JP | 3399918 | 4/2003 |
| JP | 3467513 | 11/2003 |
| JP | 2006-119482 | 5/2006 |
| JP | 2009-112399 | 5/2009 |
| JP | 2010-180926 | 8/2010 |
| JP | 2011-07655 | 4/2011 |

\* cited by examiner

FIG.9

| NO. | MAIN BODY MODEL | SEISMIC INTENSITY | QUAKE DIRECTIONS | AMOUNT OF MOVEMENT (mm) | | | | ASSESS. |
|---|---|---|---|---|---|---|---|---|
| | | | | AFTER QUAKE | | DURING QUAKE | | |
| | | | | SOLEPLATE | SYSTEM | SYSTEM | | |
| 1 | ANCHOR-LESS MODEL | 6 LOW | XY | 1 | 2 | ↓ | | ○ |
| 2 | | 6 LOW | XYZ | 2 | 3 | ↓ | | ○ |
| 3 | | 6 HIGH | XY | 58 | 55 | ↓ | | ○ |
| 4 | | 6 HIGH | XYZ | 89 | 87 | ↓ | | ○ |
| 5 | | 7 | XY | 312 | 309 | 327 | | ○ |
| 6 | ANCHOR MODEL | 6 HIGH | XY | 4 | 9 | ↓ | | ○ |
| 7 | | 6 HIGH | XYZ | 4 | 11 | ↓ | | ○ |
| 8 | | 7 | XY | 3 | 12 | ↓ | | ○ |
| 9 | JACK-UP MODEL | 6 LOW | XY | 12 | 20 | ↓ | | ○ |
| 10 | | 6 HIGH | XY | 72 | 298 | 344 | | ○ |
| 11 | | 7 | XY | 28 | 1367 | ↓ | | × |

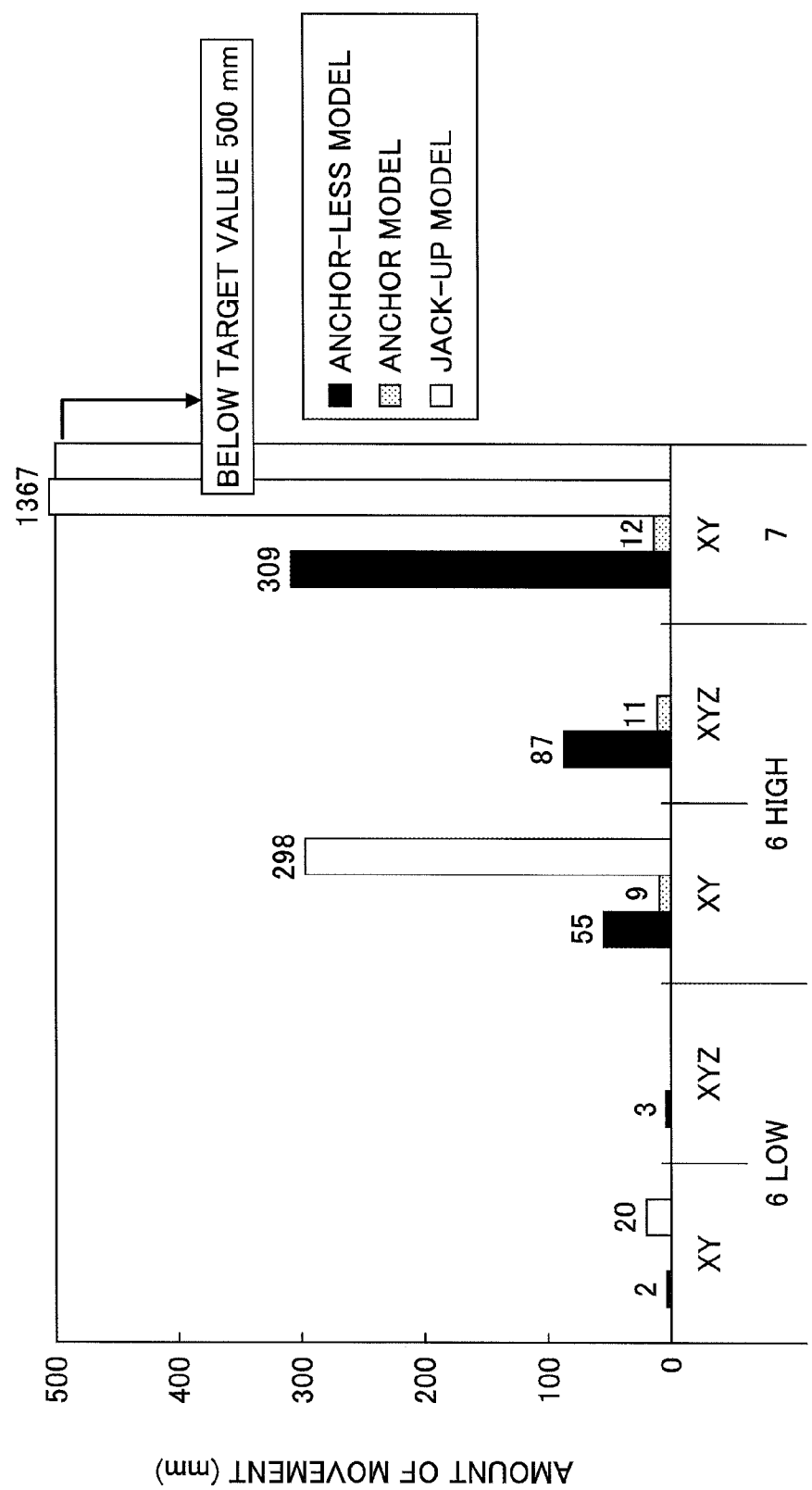

EARTHQUAKE RESISTING APPARATUS

CROSS-REFERENCE TO RELATED APPLICATIONS

The present application claims priority under 35 U.S.C. §119 to Japanese Application No. 2012-005877, filed Jan. 16, 2012, and Japanese Application No. 2012-241667, filed Nov. 1, 2012.

BACKGROUND OF THE INVENTION

1. Field of the Invention

The present disclosure generally relates to earthquake resisting apparatuses, and more particularly to an earthquake resisting apparatus which is appropriate for use in an electronic device, such as an image forming device, at a time of installation of the electronic device.

2. Description of the Related Art

In recent years, with development of the technology of earthquake-proof building construction, a possibility of collapsing of buildings in a major earthquake (for example, an earthquake with seismic intensity level 6) is decreasing.

For this reason, collapsing of a building due to a major earthquake may be prevented, but comparatively large structures within the building may move or overturn due to the major earthquake. It is predicted that the cases in which damage or injuries are caused due to collision with such moving or overturning structures, or evacuation routes are obstructed by the structures are increasing.

In particular, electrophotographic type image forming devices, such as copiers, printers, facsimiles, and multi-function peripherals, are installed on casters or the like in offices such that the devices are easily movable. In many cases, these devices easily move in case of an earthquake.

In a case of a comparatively large-sized image forming device, after the image forming device is moved on the casters to an installation place, an installation height of the image forming device at the installation place is adjusted using the adjusters. Usually, the casters of the image forming device are raised from the floor after installation. However, in a case of a major earthquake, there is a possibility of movement or overturning of the image forming device. Its outside dimensions and weight are comparatively large and there is a danger that damage or injuries are caused due to collision with the image forming device or evacuation routes are obstructed by the image forming device.

In order to avoid such situations, a disaster prevention person in charge of a building or in charge of each floor of a building is required to take anti-disaster measures for preventing movement and overturning of installation objects within the building.

For example, Japanese Laid-Open Patent Publication No. 09-193939 discloses an overturn preventing instrument which is aimed to prevent movement or overturning of an installation object, as the technology regarding prevention of movement and overturning of installation objects. By this overturn preventing instrument, a bottom surface of the installation object is fixed to the upper parts of skids on a horizontal floor, so that the range of the overturn preventing instrument in contact with the floor is extended from the bottom surface of the installation object. Thereby, overturning of the installation object is prevented.

Moreover, Japanese Laid-Open Patent Publication No. 10-252825 discloses a base isolation structure which includes an elastic body to support a stand leg of an installation object, and this elastic body is arranged in a hole of a free-access floor. Japanese Laid-Open Patent Publication No. 2000-145113 discloses an earthquake resisting device which includes a frame arranged on a base floor, and an installation object is fixed to the frame so that the installation object is installed without damaging the base floor.

Further, Japanese Laid-Open Patent Publication No. 2002-070945 discloses a base isolating device which includes a plate-like load transmitting member slidably arranged on a floor surface, a plurality of device support legs slidably arranged on the load transmitting member, a regulation member which regulates a sliding range of the device support leg on the load transmitting member, and an elastic member which is fixed to the device support leg and arranged in the inside of the regulation member to give repulsive force to movements of the device support leg from a predetermined position in horizontal and vertical directions.

In a case of a minor earthquake, the above-mentioned base isolation device moves horizontally on the load transmitting member, and the vibration of the base isolation device is attenuated by the friction of the support leg and the load transmitting member and by elastic deformation of the elastic member. In a case of a major earthquake, the above-mentioned base isolation device moves further and the range of elastic deformation of the elastic member is exceeded. The support leg is directly regulated by the regulation member. The movement of the base isolation device at this time is transmitted to the load transmitting member, and the load transmitting member starts sliding on the floor. Therefore, the base isolation device attenuates the vibration by the friction between the load transmitting member and the floor.

Japanese Laid-Open Patent Publication No. 2009-112399 discloses a movement prevention instrument which connects a floor and a device to prevent movement of the device. A bottom plate of this movement prevention instrument is formed of an adhesive damping material having adhesion and vibration damping properties, and this adhesive damping material is attached to the floor so that the movement prevention instrument is installed.

In a case of the overturn preventing instrument of Japanese Laid-Open Patent Publication No. 09-193939, the overturning of the installation object due to earthquakes is effectively prevented. However, the movement of the installation object due to earthquakes cannot be prevented. For example, when iron is used as the material of the skid, the coefficient of static friction between the overturn preventing instrument and the concrete floor is approximately 0.4. If a major earthquake whose seismic intensity level is 6 or more (horizontal acceleration of approximately 800 Gal) takes place, the acceleration of 0.8 g is applied to the installation object. At this time, the frictional force derived from the coefficient of static friction (0.4) is smaller than the force derived from the horizontal acceleration (0.8 g), and the installation object easily moves. Hence, there may be a danger that the moving installation object collides with people or obstructs evacuation routes.

In addition, in the case of Japanese Laid-Open Patent Publication No. 09-193939, the installation object is directly attached to the skid. The overturn preventing instrument should not be used for electronic devices which require a level surface adjustment in a case of installation. Further, the skid is designed to extend outward from the bottom surface of the installation object, and there is also a danger that a user stumbles over the skid.

In the case of the base isolation structure of Japanese Laid-Open Patent Publication No. 10-252825, it is aimed at preventing movement or overturning of the installation object. However, it is necessary to carry out construction work to perforate the hole in the floor and to embed the elastic body and the screw in the hole. Hence, the base isolation structure costs time and effort for such construction work. There are many kinds of floors, and it is difficult to prepare the base isolation structure in advance for the respective floors. The construction work appropriate for each floor must be performed individually. Hence, the construction work will become complicated and the cost will be increased.

In the case of Japanese Laid-Open Patent Publication No. 10-252825, relocation of an installation object is difficult. For example, if the material of a new floor at a relocation place is different from the material of the floor where the installation object is currently installed, the relocation of the installation object cannot be performed. Even if the material of a new floor at a relocation place is the same as the material of the floor where the installation object is currently installed, it is necessary to carry out the construction work at the relocation place, which costs time and effort which are the same as those of the first installation. Further, in the case of Japanese Laid-Open Patent Publication No. 10-252825, the weight of the installation object is supported by the elastic body and the casters. If the installation object is a heavy-weight device, there is a possibility that the device is partially depressed and the initial attitude of the device cannot be maintained.

In the case of Japanese Laid-Open Patent Publication No. 2000-145113, the installation object can be installed on the base floor without damaging the base floor. However, the frame of the earthquake resisting device is disposed on the base floor, and if the base floor is a concrete floor, the earthquake resisting device cannot be used. In addition, in a case of a major earthquake, the frame may be moved to the base floor. No measures for preventing movement of the frame to the floor are present.

Similar to the disclosure of Japanese Laid-Open Patent Publication No. 09-193939, the disclosure of Japanese Laid-Open Patent Publication No. 2002-070945 is effective to prevent the overturning of the installation object due to earthquakes, but it cannot prevent the movement of the installation object due to earthquakes. Namely, when a large quake arises, transmission of the quake is attenuated by slipping between the load transmitting member and the floor surface, and the installation object can easily move. Hence, there may be a danger that the moving installation object collides with people or obstructs evacuation routes.

In a case of the movement prevention instrument of Japanese Laid-Open Patent Publication No. 2009-112399, it is possible to prevent movement and overturning of a device. However, it is necessary to stick the adhesive damping material (gel sheet) having the adhesion property to the floor surface. If the need for relocation of the movement prevention instrument arises, it is necessary to remove the existing adhesive damping material and prepare a new adhesive damping material. This is troublesome and the cost will be increased.

Further, in a case of a large-sized or heavy-weight installation object, it is necessary to use a plate having a large surface area or a high rigidity as a soleplate of the installation object. If the soleplate is stuck on the floor using an adhesive sheet material, it is difficult to gradually remove the adhesive sheet material from an end thereof. However, it is necessary to tear off the adhesive sheet material at a time, and the difficulty of the removal of the adhesive sheet material arises.

Japanese Laid-Open Patent Publication No. 2010-180926 discloses an earthquake-proof fixing method using a pressure sensitive adhesive sheet. In this method, an adhesive sheet is disposed beneath a supporting portion of an installation object, and a tapped hole for removal is formed in the supporting portion to vertically penetrate the supporting portion. When the installation object is removed from the floor, a bolt for removal is screwed into the tapped hole for removal and the adhesive sheet is removed from the floor by lifting the supporting portion from the floor. However, when a soleplate having a large surface area and a high rigidity is used, it is difficult to rotate the bolt for removal, and the floor surface may be damaged because a strong force is exerted on the floor surface.

In addition, in the case of Japanese Laid-Open Patent Publication No. 2009-112399, the normal free access floor is put on the support member in the building floor, and it is necessary to fix the free access floor to the building floor. Therefore, the installation position is limited. For example, the installation object must be installed directly on a concrete floor.

SUMMARY OF THE INVENTION

In an aspect, the present disclosure provides an earthquake resisting apparatus which includes a movement limiting member having a coefficient of static friction between the movement limiting member and an installation floor, in which the coefficient is larger than or equal to a predetermined value to regulate slipping of a load transmitting member over the installation floor, wherein movement and overturning of the installation object on the floor in a building in case of an earthquake can be prevented.

In an embodiment, the present disclosure provides an earthquake resisting apparatus which is installed between an installation object and an installation floor when the installation object is installed on the installation floor, the apparatus including: a load transmitting member which is a plate-like member on which the installation object is mounted and has a surface area larger than an installation area of the installation object; a movement limiting member which is a plate-like or sheet-like member arranged between the load transmitting member and the installation floor, the movement limiting member bonded to the load transmitting member and having a coefficient of static friction between the movement limiting member and the installation floor when a load acts on the installation object in a horizontal direction in a state in which the installation object is fixed to the load transmitting member, in which the coefficient is larger than or equal to a predetermined value; and a fastening part which connects the installation object and the earthquake resisting apparatus.

Other objects, features and advantages of the present disclosure will become more apparent from the following detailed description when read in conjunction with the accompanying drawings.

BRIEF DESCRIPTION OF THE DRAWINGS

FIG. 9 is a diagram showing a list of measurement results of the amounts of movement of a soleplate and an installation object after the input of the earthquake wave, and the amounts of movement of the installation object during the input of the earthquake wave.

FIG. 10 is a diagram showing the amounts of movement of the installation object after the input of the experimental earthquake wave.

DETAILED DESCRIPTION OF THE PREFERRED EMBODIMENTS

Figure 1:
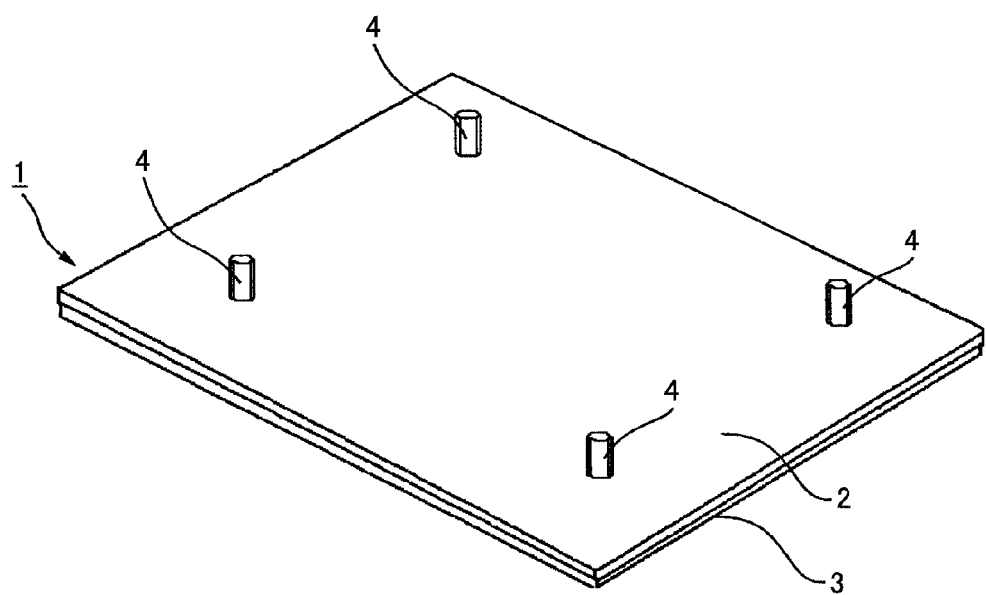
FIG. 1 is a perspective view of an embodiment of an earthquake resisting apparatus of the present disclosure.

A description will be given of embodiments of the present disclosure with reference to the accompanying drawings.

First Embodiment

Earthquake Resisting Apparatus

An earthquake resisting apparatus (earthquake resisting apparatus 1) of the first embodiment is installed between an installation object (image forming device 20) and an installation floor (installation floor 10) when the installation object is installed on the installation floor. The earthquake resisting apparatus includes a load transmitting member (soleplate 2) which is a plate-like member on which the installation object is mounted, and has a surface area larger than an installation area of the installation object, a movement limiting member (rubber sheet 3) which is a plate-like or sheet-like member arranged between the load transmitting member and the installation floor, the movement limiting member bonded to the load transmitting member and having a coefficient of static friction between the movement limiting member and the installation floor when a load acts on the installation object in a horizontal direction in a state where the installation object is fixed to the load transmitting member, in which the coefficient is larger than or equal to a predetermined value, and a fastening part (screw 4) which connects the installation object and the earthquake resisting apparatus.

In the following, the case in which a large-sized electrophotographic image forming device (which is (1) a device having a depth of 990 mm, a length of 1280 mm, a height of 1260 mm, and a weight of approximately 630 kg; or (2) a device having a depth of 910 mm, a length of 1320 mm, a height of 1218 mm, and a weight of approximately 580 kg) is used as an example of the installation object will be explained.

FIG. 1 is a perspective view of the earthquake resisting apparatus 1 of this embodiment. As shown in FIG. 1, the earthquake resisting apparatus 1 includes a soleplate 2 (the load transmitting member) which has an installation surface to install the installation object thereon and receive a load from the installation object. The earthquake resisting apparatus 1 includes a rubber sheet 3 (the movement limiting member) arranged between the floor surface and a back surface of the soleplate 2 opposite to the mounting surface of the installation object (between the earthquake resisting apparatus 1 and the floor surface). The earthquake resisting apparatus 1 includes screws 4 (the fastening part) which are arranged to extend upward from four places of the soleplate 2 and connect the installation object and the earthquake resisting apparatus 1.

Figure 2:
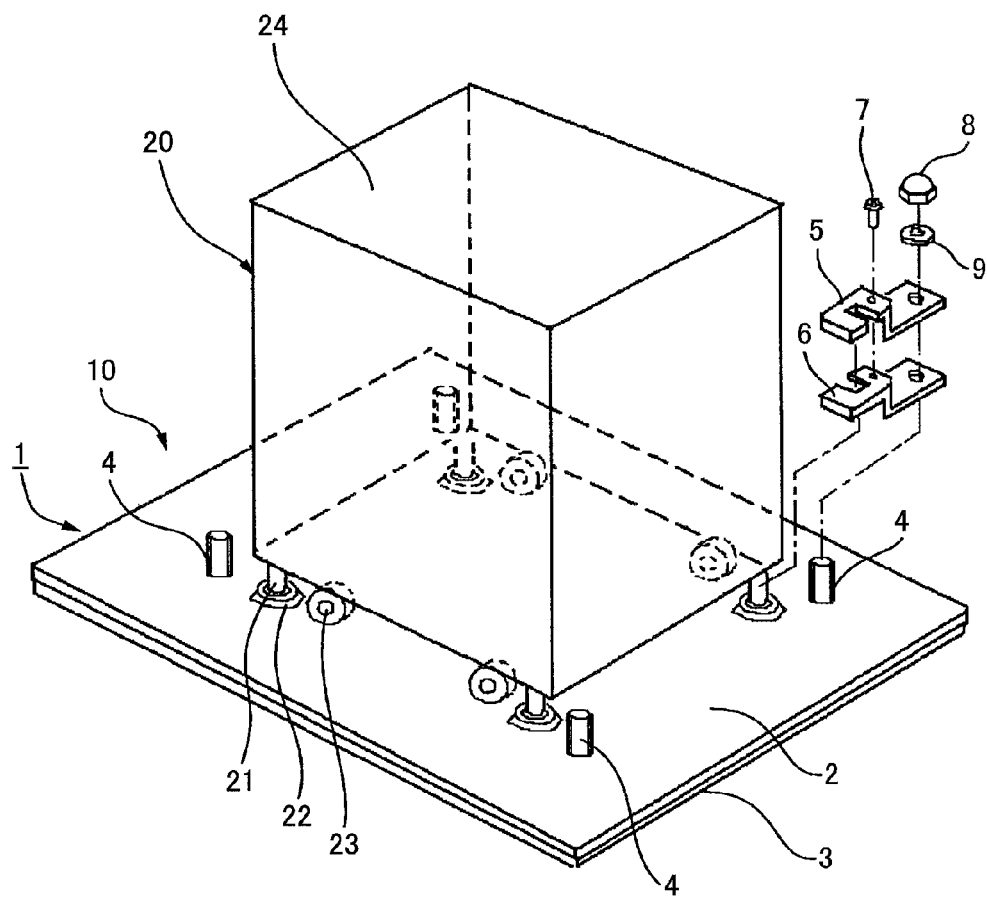
FIG. 2 is a diagram for explaining a case in which an image forming device is mounted on the earthquake resisting apparatus in FIG. 1 and fixed to an installation floor.

FIG. 2 is a diagram for explaining a case in which an image forming device 20 is mounted on the earthquake resisting apparatus 1 shown in FIG. 1 and fixed onto an installation floor 10 which is a concrete floor. As shown in FIG. 2, the image forming device 20 includes casters 23 (transporting unit) attached to four corner portions of a bottom surface of a main body 24, and adjusters 21 (adjusting unit) arranged in the vicinity of the casters 23 to adjust a height of the image forming device 20 from the installation floor 10 so that a height of a top surface of the main body 24 from the installation floor 10 satisfies predetermined level surface requirements.

[Load Transmitting Member]

The soleplate 2 has a surface area (or an area of the portion which touches the floor) that is larger than the installation area of the image forming device 20, and it is possible to prevent overturning of the image forming device 20 with the use of the soleplate 2. From a viewpoint of overturning prevention of the image forming device 20, it is preferred that the length of each of the short sides of the soleplate 2 is larger than or equal to the height of the image forming device 20, which may be varied depending on the centroid position of the image forming device 20.

The soleplate 2 is made of a material which has durability (rigidity) whereas the soleplate 2 itself or the installation floor 10 is not deformed by the load of the installation object. If the material of the soleplate 2 has such a durability (rigidity) that the soleplate 2 itself or the installation floor 10 is not deformed by the load of the installation object, the material and the thickness of the soleplate 2 are optional and not limited to a specific material or thickness. For example, when the weight of the installation object exceeds 200 kg, the soleplate 2 is formed of an iron plate which is 2 mm thick or larger. The material of this soleplate 2 has a good rigidity for preventing a local depression of the soleplate 2 from being produced when the installation object is installed on the floor which is formed of aluminum or the like. In addition, it is possible to maintain the initial height and the horizontal level of the installation object which are adjusted at the time of installation. In a case of a system in which plural system devices are connected together, it is necessary that the height and the horizontal level of each system device are less than predetermined height and level requirements. In such a case, it is important to prevent the variation of the height of each system device over an extended period of time.

For example, the soleplate 2 may be formed of an iron plate which is approximately 4 mm thick. From a viewpoint of prevention of user's tripping over the soleplate 2, it is preferred that the soleplate 2 has the smallest possible thickness which is adequately large enough to support the weight of the installation object.

In addition, a screw (projection screw) 4 which constitutes the fastening part is fixed (or bonded) beforehand to the soleplate 2 at a predetermined position in the vicinity of each of the four corner portions of the soleplate 2 by welding. The composition of the fastening part will be described later.

[Movement Limiting Member]

The rubber sheet 3 (the movement limiting member) is arranged on the back surface of the soleplate 2. The rubber sheet 3 is inexpensive and durable, and handling of the rubber sheet 3 is also easy. Hence, the rubber sheet 3 can be used appropriately as the movement limiting member. The rubber sheet 3 is pliable, and the pliability of the rubber sheet 3 enables a coefficient of static friction between the installation floor and the movement limiting member to be increased corresponding to irregularities of the installation floor 10. For example, a 5-mm thick rubber sheet having a surface area that is the same as that of the soleplate 2 may be used as the rubber sheet 3. Similar to the soleplate 2, from a viewpoint of prevention of users tripping over the soleplate 2, it is preferred that the rubber sheet 3 has the smallest possible thickness which is adequately large enough to support the weight of the installation object.

In the present embodiment, the rubber sheet 3 is bonded to the back surface of the soleplate 2 in its entirety by using an adhesive sheet. However, the adhesion method of the rubber sheet 3 and the soleplate 2 is not limited to this embodiment. Any adhesion method may be used if the coefficient of static friction between the rubber sheet 3 and the floor surface is maintained to be larger than or equal to a predetermined value. It is not necessary to bond the rubber sheet 3 to the back surface of the soleplate 2 in its entirety by using an adhesive sheet. It is adequate that the rubber sheet 3 is partially bonded to the back surface of the soleplate 2.

In the present embodiment, the rubber sheet 3 is fully bonded to the entire back surface of the soleplate 2. However, the coefficient of static friction does not depend on the surface area only. It is not necessarily required that the rubber sheet 3 is fully bonded to the entire back surface of the soleplate 2.

Accordingly, the rubber sheet 3 may be arranged so that the surface area of the rubber sheet 3 is smaller than the surface area of the soleplate 2. In such a case, the rubber sheet 3 may be disposed in the position (which covers the circumference of one of the four adjusters 21) where the rubber sheet 3 receives the load from each adjuster 21. In addition, it is not required to use a single rubber sheet 3. Alternatively, plural rubber sheets 3 may be arrayed without clearance, or separated from one another with gaps therebetween.

In the present embodiment, the rubber sheet 3 is used as an example of the movement limiting member between the soleplate 2 and the installation floor 10. However, the movement limiting member is not restricted to this embodiment. It is possible that the movement limiting member be arranged so that the coefficient of static friction between the movement limiting member and the installation floor 10 is larger than or equal to a predetermined coefficient of static friction. In this regard, the coefficient of static friction is varied depending on the material or surface roughness of the installation floor (which is a concrete floor in this embodiment). Hence, it is necessary to select the optimal material of the movement limiting member that enables the coefficient of static friction to be larger than or equal to the predetermined coefficient of static friction.

For example, when the installation floor is a concrete floor, using any of a rubber sheet, a cedar plate, a corkboard, a rock plate (rock mass), etc. as the material of the movement limiting member enables the coefficient of static friction to be larger than or equal to the predetermined coefficient of static friction. For example, if a cedar plate or a concrete floor is selected as the material of the movement limiting member, the coefficient of static friction is approximately 0.8. In this case, even if an external force ranging from 0.3 g to 0.7 g is exerted, the movement limiting member hardly moves.

[Fastening Part]

Next, installation of the installation object and fixing of the installation object to the earthquake resisting apparatus 1 will be described. The earthquake resisting apparatus 1 includes one or more fastening parts. The fastening parts are fixed to the main body 24 of the image forming device 20 or the adjusters 21 which serve as the leg portions of the image forming device 20.

Figure 3:
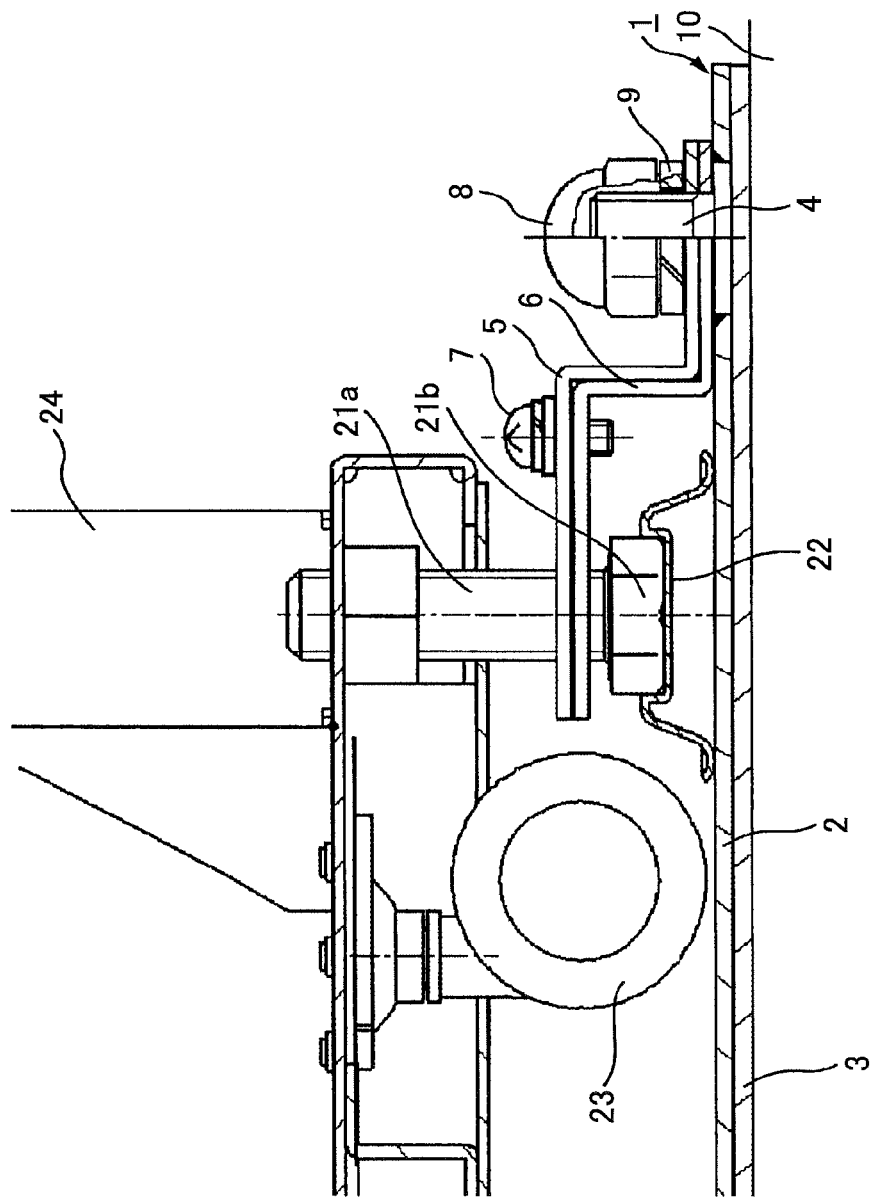
FIG. 3 is an enlarged cross-sectional view of the image forming device which is fixed to a fastening part of the earthquake resisting apparatus.

FIG. 3 is an enlarged cross-sectional view of the earthquake resisting apparatus 1 shown in FIG. 2 and the image forming device 20 (one leg portion) in a state in which the leg portion of the image forming device 20 is fixed to the fastening part of the earthquake resisting apparatus 1. The image forming device 20 is horizontally movable on the casters 23. At a time of installation, the image forming device 20 is moved on the casters 23 to a predetermined installation position on the soleplate 2 and positioning of the image forming device 20 is performed at the installation position. After the positioning is performed, the rotational parts 21b of the four adjusters 21 are rotated clockwise. Subsequently, the installation height of the image forming device 20 from the installation floor 10 is set to a desired height by adjusting the amount of projection of the threaded shafts 21a of the adjusters 21 downward from the main body 24. Even when surface irregularities or inclinations are present on the installation floor 10, the image forming device 20 can be installed to satisfy the level surface requirements by adjusting the amount of projection of each adjuster 21.

At the time of installation of the image forming device 20, the casters 23 are in a lifted state in which the casters 23 are lifted or separated from the soleplate 2. The main body 24 of the image forming device 20 is supported by the four adjusters 21. In the present embodiment, adjuster receptacles 22 are disposed on the floor surface for the purpose of distributing the load from the adjusters 21 to the soleplate 2 and the installation floor. The image forming device 20 is installed on the soleplate 2 via the adjuster receptacles 22 in this embodiment. Alternatively, the image forming device 20 may be installed with the adjusters 21 directly in contact with the soleplate 2 without using the adjuster receptacles 22.

Subsequently, as shown in FIG. 2, a fixing bracket 5 and a fixing bracket 6 as connecting parts are disposed at the leg portion of the image forming device 20. The fixing brackets 5 and 6 are fitted so that the threaded shaft 21a of the adjuster 21 is sandwiched between the openings of the fixing brackets 5 and 6. The holes on the other sides of the fixing brackets 5 and 6 are inserted in the screw 4, and the fixing brackets 5 and 6 are connected together by a screw 7. The configuration of the fixing brackets in this embodiment is to be regarded as being exemplary and not restrictive. Alternatively, the fixing brackets 5 and 6 may be formed into one fixing bracket.

Thereby, the screws 4 of the earthquake resisting apparatus 1 can be fastened to the threaded shafts 21a of the adjusters 21 by the fixing brackets 5 and 6. Finally, the screws 4 are tightened with ball-head lock nuts 8 via spring washers 9.

The installation work is performed for all the four adjusters 21 and the four screws 4, and the image forming device 20 is fixed onto the soleplate 2. The adjuster 21 and the screw 4 can be fixed to each other at only one place. However, from a viewpoint of prevention of rotational movement of the image forming device 20, it is preferred to fix the adjuster 21 and the screw 4 at two or more places. In such a case, the required number of screws 4 may be formed in the soleplate 2.

[Installation of Installation Object]

The earthquake resisting apparatus 1 described above may be arranged on the installation floor 10 without using adhesive members or anchor bolts between the back surface of the earthquake resisting apparatus 1 and the installation floor 10. Therefore, when transferring the image forming device 20 to a new installation place, the image forming device 20 is moved from the earthquake resisting apparatus 1, and the earthquake resisting apparatus 1 is transferred to the new installation place of the image forming device 20. Thereafter, the image forming device 20 can be easily transferred onto the earthquake resisting apparatus 1 by using the fixing brackets and others as described above.

When the installation object is a large-sized device, the installation area of the soleplate 2 is also increased. If the installation object is fixed to the installation floor 10 by the adhesive sheet, it is difficult to remove the adhesive sheet from the installation floor 10. This problem does not arise in the earthquake resisting apparatus 1 of the present embodiment. Transferring of the installation object in the present embodiment can be easily performed. In addition, it is not necessary to hammer the anchor bolts, and it is possible to prevent damaging of the installation floor.

The image forming device 20 is used in a fixed state in which the image forming device 20 is fixed as described above. If a major earthquake occurs in this state, the installation floor 10 will vibrate in the up/down and right/left directions. Although variations are present according to the cycle of the quake, in a case of an earthquake whose seismic intensity is higher than level 6 and lower than level 7, the image forming device 20 will vibrate with an acceleration ranging from 300 Gal to 700 Gal. This is equivalent to the range of acceleration between 0.3 g and 0.7 g. The Japan Meteorological Agency seismic intensity scale, defined by the Japan Meteorological Agency, gives a total of 8 levels of 0 to 7 for classifying the magnitudes of earthquakes. For example, in the Mid Niigata Prefecture in October of 2004, an acceleration of 1300 Gal was observed, and in the East Japan earthquake in March of 2011, an acceleration of 2700 Gal was observed. In addition, in the East Japan earthquake, the seismic intensity level 7 (equivalent to the class X (intense) of the Modified Mercalli intensity scale) was observed in Kurihara-shi, Miyagi Prefecture, and the seismic intensity level 6 (equivalent to the class VIII (destructive)—IX (violent) of the Modified Mercalli intensity scale) was observed in Tsukuba-shi, Ibaraki Prefecture.

In the present embodiment, the coefficient of static friction between the rubber sheet 3 and the installation floor (concrete floor) 10 is 0.7 or more, which is resistible to the maximum quake excitation force. It is possible to prevent the image forming device 20 from being greatly moved. On the other hand, when the soleplate 2 of the iron plate is installed directly on the installation floor without using the rubber sheet 3, the coefficient of static friction between the soleplate 2 and the concrete floor is approximately 0.4, which is not resistible to the maximum quake excitation force. In this case, the image forming device 20 will be greatly moved or overturned (see the Examples below).

Theoretically, using a movement limiting member having a coefficient of static friction larger than that of the rubber sheet 3 allows the earthquake resisting apparatus 1 to be resistible to earthquakes with the seismic intensity level 7 or higher. However, prevention of movement or overturning of the installation object becomes meaningless in a case of a great earthquake with which it is predicted that many well-built structures are destroyed or collapsed. In the present embodiment, the coefficient of static friction is larger than or equal to 0.7, taking into consideration the ability of resistance to earthquakes whose seismic intensity level is 6. For example, using a movement limiting member having a coefficient of static friction ranging from 0.7 to 0.8 allows the earthquake resisting apparatus 1 to prevent movement or overturning of the installation object upon occurrence of an earthquake with the seismic intensity level 6 or equivalent.

When transferring the image forming device 20, the procedure that is reversal to the above-described installation procedure may be performed. Namely, the fixing brackets 5 and 6 are removed, the rotational parts 21b of the adjusters 21 is rotated counterclockwise, and the adjusters 21 are raised from the floor surface so that the main body 24 is supported by the casters 23. In this state, the image forming device 20 can be easily removed from the soleplate 2. After the earthquake resisting apparatus 1 is transferred to the new installation place, the above-described installation procedure may be performed.

As described above, in the earthquake resisting apparatus 1 of this embodiment, the load transmitting member (soleplate 2) larger than the installation object is used, and movement or overturning of the installation object in a case of an earthquake can be prevented. By providing, on the back surface of the soleplate 2, the movement limiting member (rubber sheet 3) having a coefficient of static friction between the movement limiting member and the installation floor 10 larger than or equal to a predetermined value, slipping of the soleplate 2 over the installation floor 10 on which the installation object is installed can be prevented, and movement of the installation object due to horizontal vibration at a time of occurrence of an earthquake can be prevented.

The earthquake resisting apparatus 1 of this embodiment is installed on the installation floor 10 without attaching an adhesive member to the installation floor 10. The earthquake resisting apparatus 1 of this embodiment can be easily transferred when the installation object is transferred. The earthquake resisting apparatus 1 of this embodiment can be installed on any of a concrete floor, a free access floor, a carpet, etc., without restrictions due to the floor surface.

The earthquake resisting apparatus 1 of this embodiment may be fixed using the existing adjusters 21, and it is not necessary to provide a new component part, such as a connecting part, in the image forming device. The existing soleplate 2 may be provided in the earthquake resisting apparatus 1 of this embodiment. The earthquake resisting apparatus 1 of this embodiment may be easily installed.

After the height of the image forming device 20 from the installation floor is adjusted using the adjusters 21, the image forming device 20 can be fixed to the soleplate 2. The leg portions of the image forming device 20 are fixed directly, without using the elastic member as disclosed in Japanese Laid-Open Patent Publication No. 2002-070945. Hence, the composition of the fastening parts, including screws and fixing brackets, can be simplified.

Second Embodiment

Next, another embodiment of the earthquake resisting apparatus of the present disclosure will be described. In the following embodiment, the elements which are essentially the same as corresponding elements in the preceding embodiment are designated by the same reference numerals and a description thereof will be omitted.

Figure 4:
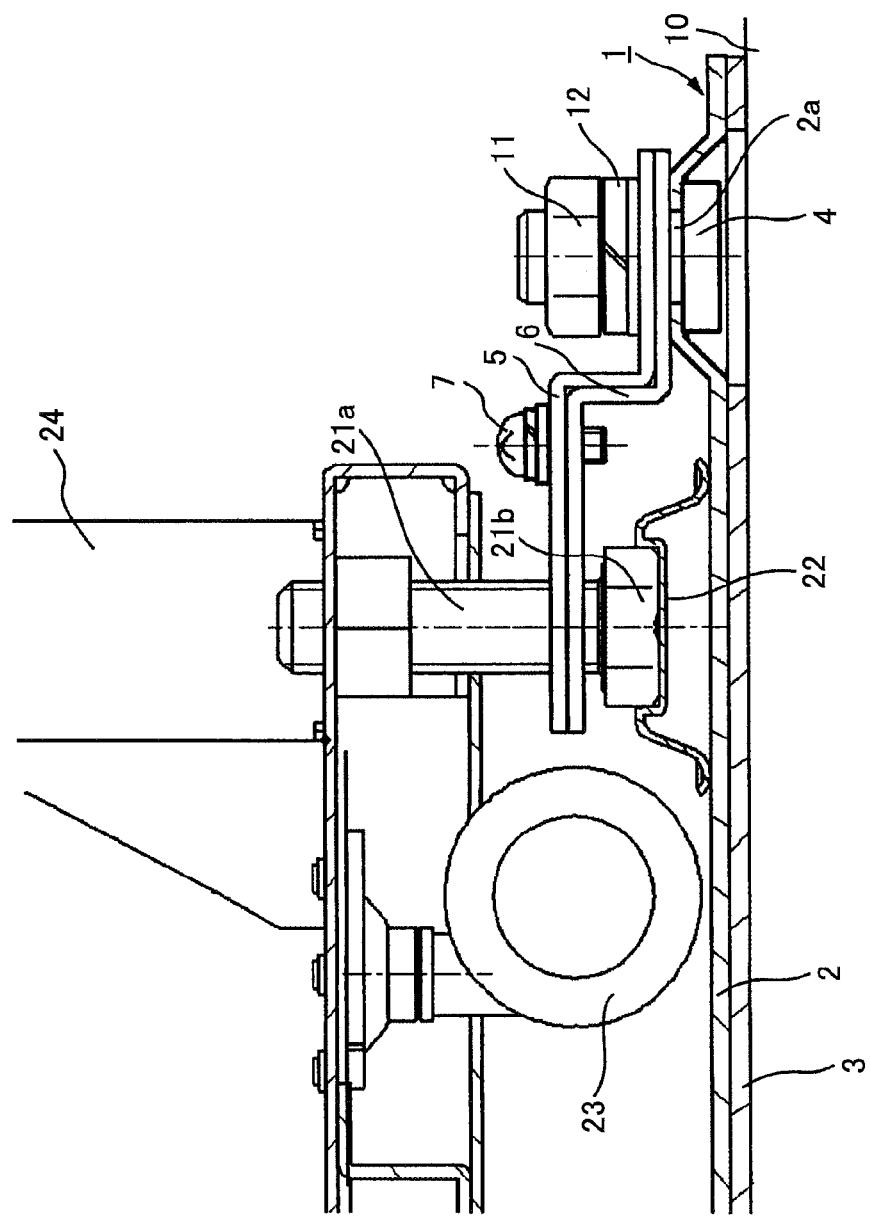
FIG. 4 is an enlarged cross-sectional view of the image forming device which is fixed to a fastening part of another embodiment of the earthquake resisting apparatus.

FIG. 4 is an enlarged cross-sectional view of the earthquake resisting apparatus 1 and the image forming device 20 (one leg portion) in a state in which the leg portion of the image forming device 20 is fixed to the fastening part of the earthquake resisting apparatus 1. In the present embodiment, the screw 4 is not welded to the soleplate 2. Rather, a screw hole 2a is formed in the position of the soleplate 2 equivalent to the welding position of the screw 4 of the first embodiment, and the soleplate 2 is raised in this position to form the screw hole 2a. The rubber sheet 3 is formed with a cut-out portion in the corresponding position of the screw hole 2a.

In the earthquake resisting apparatus 1 of this embodiment, the screw 4 is inserted in the screw hole 2a from the bottom side of the screw hole 2a, and the screw 4 is tightened with a nut 11 via a spring washer 12 so that the fixing brackets 5 and 6 are fixed. Therefore, separation of the flange part of the screw 4 is prevented, and the present embodiment provides the fixing force which is equivalent to that of the preceding embodiment. The screw 4 in the present embodiment is not in a projecting shape as in the preceding embodiment (in which the screw 4 is welded) and is appropriate for stacking at a time of storage or transport. It is not necessary to weld the screw 4, and the soleplate 2 may be easily formed.

Third Embodiment

Figure 5:
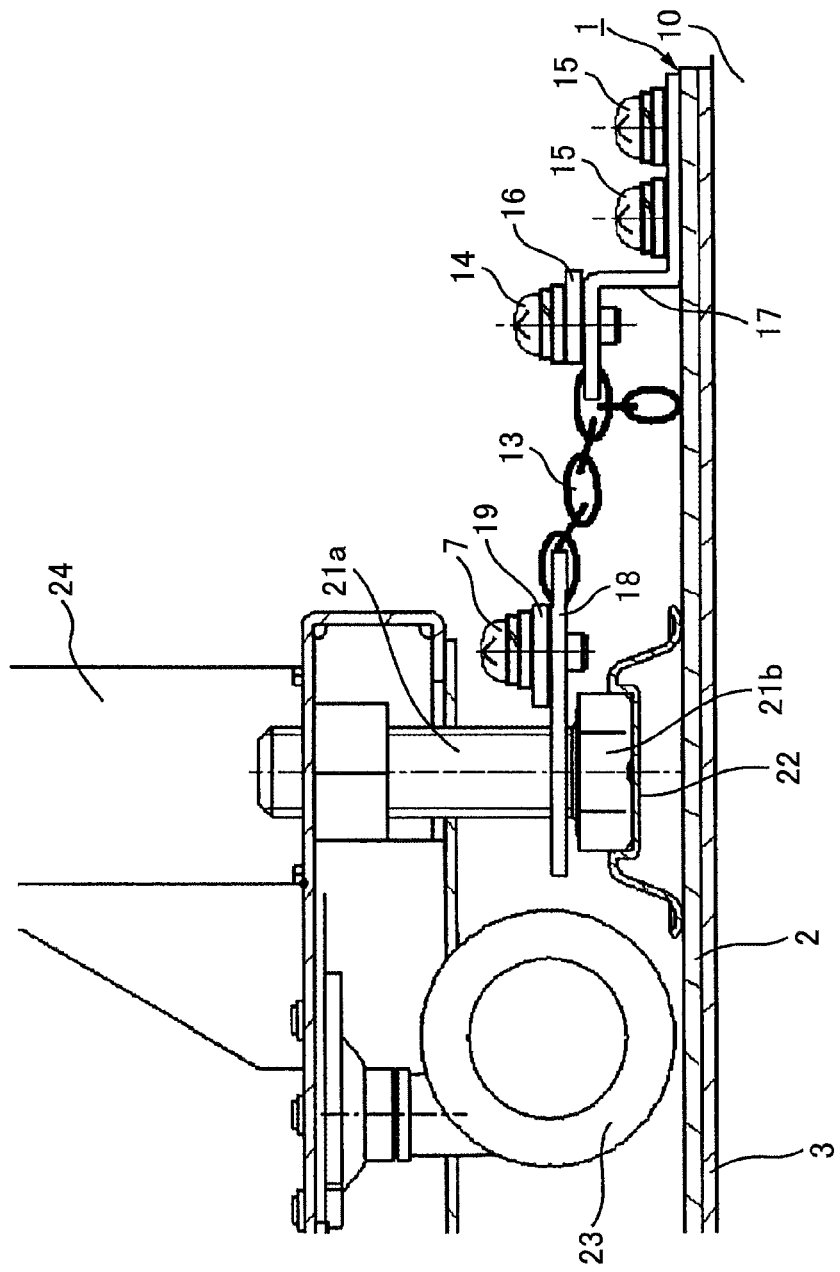
FIG. 5 is an enlarged cross-sectional view of the image forming device which is fixed to a fastening part of another embodiment of the earthquake resisting apparatus.

FIG. 5 is an enlarged cross-sectional view of another embodiment of the earthquake resisting apparatus 1 and the image forming device 20 (one leg portion) in a state in which the leg portion of the image forming device 20 is fixed to the fastening part of the earthquake resisting apparatus 1.

In the present embodiment, instead of the fixing brackets 5 and 6, a chain 13 is used to fasten the adjuster 21 of the image forming device 20 to the earthquake resisting apparatus 1. After the height of the image forming device 20 from the installation floor is adjusted using the adjuster 21, a fixing bracket 18 is fitted into the threaded shaft 21a of the adjuster 21 and the chain 13 is connected to the fixing bracket 18. A fixing bracket 19 is fixed to the fixing bracket 18 by the screw 7. Hence, separation of the chain 13 and separation of the fixing bracket 19 from the adjuster 21 can be prevented. The other end of the chain 13 is connected to a fixing bracket 17. A fixing bracket 16 is fixed to the fixing bracket 17 by the screw 14. Hence, separation of the chain 13 and separation of the fixing bracket 17 can be prevented by the screw 14.

The fixing bracket 17 is fixed to the soleplate 2 using the screws 15. In this embodiment, screw holes for the screws 15 are formed in the soleplate 2. The distance between the position of the screws 15 and the position of the adjuster 21 can be adjusted by adjusting the length of the chain 13. If the chain 13 does not loosen and a certain distance between the position of the screws 15 and the position of the adjuster 21 is present, the effect of the prevention of overturning which is the same as that in the above-mentioned embodiments can be provided. Alternatively, the chain 13 may be replaced by an elastic member (spring).

In the present embodiment, the fastening position can be made flexible. For example, even when the outside dimensions of the installation object are changed, the soleplate 2 in which plural screw holes are formed in advance can be used in common. For example, the earthquake resisting apparatus 1 may be applicable to any of various image forming devices 20 with different sizes with the commonly used soleplate 2, and at the time of model exchange of the image forming device 20, the earthquake resisting apparatus 1 can be continuously used without change. In addition, the manufacturing cost of the earthquake resisting apparatus 1 can be reduced.

Fixing of the fastening part of the earthquake resisting apparatus 1 and the image forming device 20 may be made at the main body 24, instead of the leg portion (the adjuster 21) of the image forming device 20. In this case, a fixing portion which is to be connected to the fastening part of the earthquake resisting apparatus 1 is provided in the main body 24. As the fixing portion, an elastic member (spring) or a chain, other than the above fixing brackets, may be used to fix the image forming device 20 to the earthquake resisting apparatus 1.

Fourth Embodiment

The earthquake resisting apparatus 1 has a size which is in conformity with the size of the installation object. In a case of a large-sized installation object, if the earthquake resisting apparatus 1 is constructed as a single plate-like member, the weight of the soleplate 2 must be increased with the necessity of increasing the thickness of the soleplate 2. Hence, the weight of the earthquake resisting apparatus 1 as a whole is increased, and it becomes difficult to transport and install the earthquake resisting apparatus 1.

Figure 6:
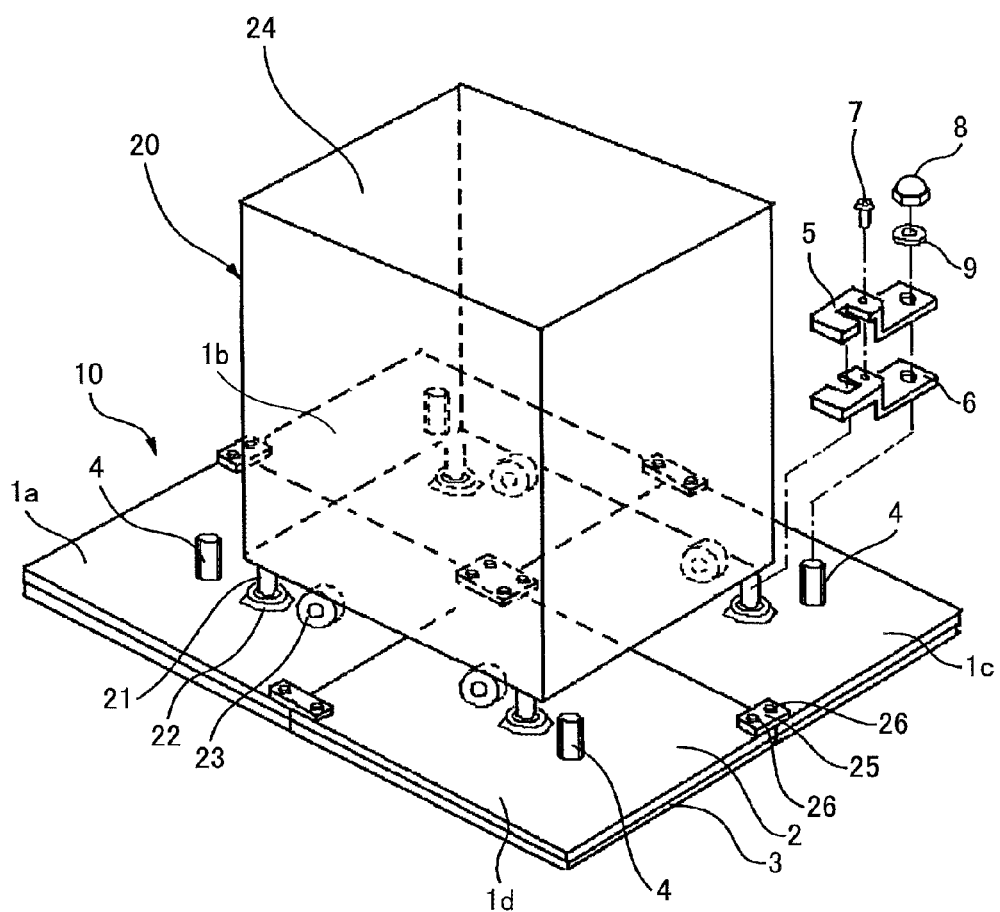
FIG. 6 is a perspective view of another embodiment of the earthquake resisting apparatus of the present disclosure.

To eliminate the problem, as shown in FIG. 6, the earthquake resisting apparatus 1 of this embodiment is divided into pieces without clearance. The pieces 1a-1d of the earthquake resisting apparatus can be coupled together by fastening connecting parts 25 to the pieces 1a-1d with screws 26.

In this composition, the weight per plate and the manufacturing cost can be reduced, and transport and installation of the earthquake resisting apparatus 1 can be easily performed. At a time of exchange of the installation object to another installation object having a different size, only some of the pieces are exchanged and the other pieces are continuously used. Hence, it is possible to provide increased convenience for the user.

Figure 7:
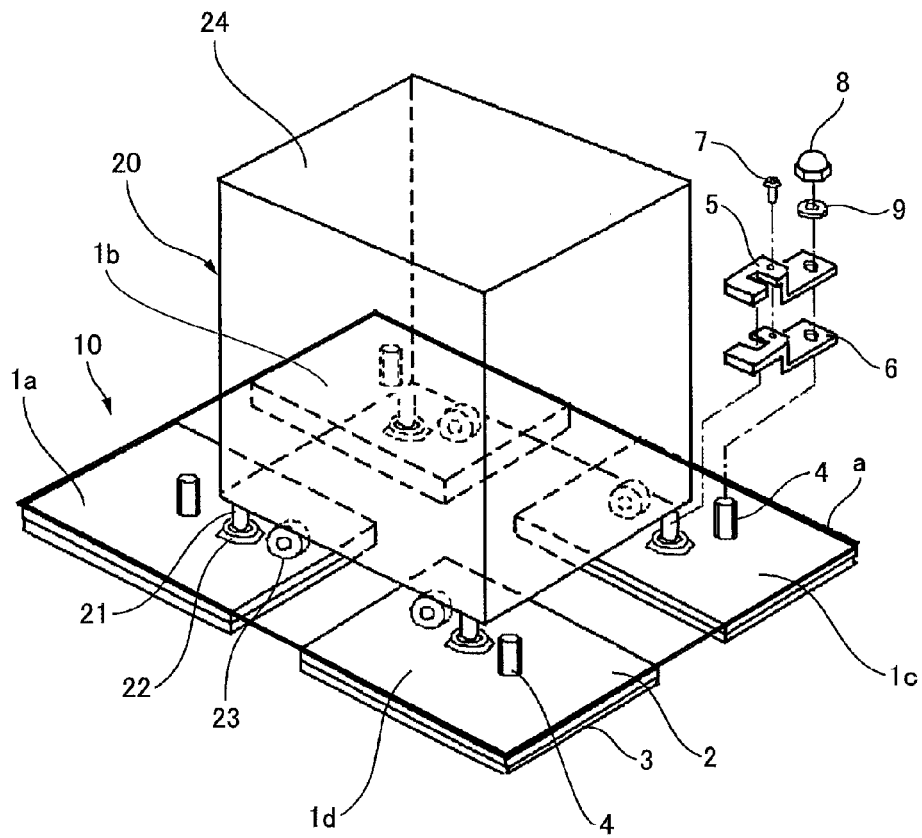
FIG. 7 is a perspective view of another embodiment of the earthquake resisting apparatus of the present disclosure.

Furthermore, as shown in FIG. 7, the earthquake resisting apparatus 1 of this embodiment is divided into pieces 1a-1d with clearances therebetween. In this embodiment, the connecting parts 25 are not used.

In this composition, the weight per plate and the manufacturing cost can be reduced further. In the example of FIG. 7, it is assumed that the surface area of the soleplate 2 and the rubber sheet 3 is a surface area (which is indicated by the line "a" in FIG. 7) which covers the peripheral parts of the pieces 1a-1d including the separating parts, which is larger than the area of the installation object 24.

Although the earthquake resisting apparatus 1 is divided into four pieces that can be coupled together in the examples shown in FIG. 6 and FIG. 7, the present disclosure is not to be restricted about the number of such divided pieces. Alternatively, the earthquake resisting apparatus 1 may be divided into two pieces, six pieces, eight pieces, etc. The manner in which the earthquake resisting apparatus 1 is divided into pieces and the coupling method for coupling the divided pieces are not restricted to those in the specifically disclosed embodiments. In addition, the divided pieces may be installed so that each divided piece has a predetermined clearance with the adjacent piece.

The present disclosure is not limited to the specifically disclosed embodiments, and variations and modifications may be made without departing from the scope of the present disclosure. For example, in the above-described embodiments, the large-sized electrophotographic image forming device has been explained as an example. The present disclosure is not limited to this example and the size and weight of the installation object are not to be restricted. The present disclosure is applicable to any of electrophotographic image forming devices (multi-function peripherals), other electronic devices, home electronic devices, pieces of furniture, etc., which are installed in office or home environments.

EXAMPLES

The following testing measurements were performed to confirm the effectiveness of the earthquake resisting apparatus of the present disclosure in which a rubber sheet is attached to the bottom of the soleplate as the movement limiting member between the soleplate and an installation floor.

Comparative Example

The soleplate with no rubber sheet attached thereto was installed in each installation floor of (1) a concrete floor, (2) a free access floor (carpet) and (3) a synthetic-resin based sheet floor (vinyl chloride sheet, etc.), and the coefficient of static friction was measured. As the soleplate, an iron plate having a width of 445 mm, a length of 945 mm, a thickness of 4 mm and a weight of 12.9 kg was used.

The average of loads at a time of a start of movement of the soleplate (or a moving start load N) and a coefficient of static friction at that time were measured. Table 1 below shows the measurement results.

TABLE 1

| Installation Floor | Moving Start Load N (average) | Coefficient of Static Friction |
|---|---|---|
| (1) Concrete | 52.1 | 0.41 |
| (2) Carpet | 63.0 | 0.50 |
| (3) Synthetic Resin | 71.6 | 0.57 |

Example-1

On the other hand, a rubber sheet (manufactured by Tigers Polymer Corp.; NBR (L); 440 mm in width, 940 mm in length and 3 mm in thickness) was bonded to the bottom of the soleplate using an adhesive sheet (manufactured by DIC; No. 8840ER) as the movement limiting member. The same testing measurement as the Comparative Example above was performed. A total weight of the rubber sheet and the soleplate was equal to 14.7 kg.

The average of loads at a time of a start of movement of the soleplate (or a moving start load N) and a coefficient of static friction at that time were measured. Table 2 below shows the measurement results.

TABLE 2

| Installation Floor | Moving Start Load N (average) | Coefficient of Static Friction |
|---|---|---|
| (1) Concrete | 100.4 | 0.70 |
| (2) Carpet | 101.6 | 0.71 |
| (3) Synthetic Resin | 108.7 | 0.75 |

As is apparent from Tables 1 and 2 above, the coefficient of static friction of Example-1 (with the rubber sheet attached) is larger than that of Comparative Example (without the rubber sheet), and the former (using the rubber sheet) can be made hard to slide compared with the latter (without the rubber sheet).

Example-2

Next, the testing measurement was performed on the following conditions. Hereinafter, X denotes the NS (north/south) direction, Y denotes the EW (east/west) direction, and Z denotes the UD (up/down) direction of the earthquake resisting apparatus.

(A) SPECIFICATIONS OF BASE

Table

Figure 8C:
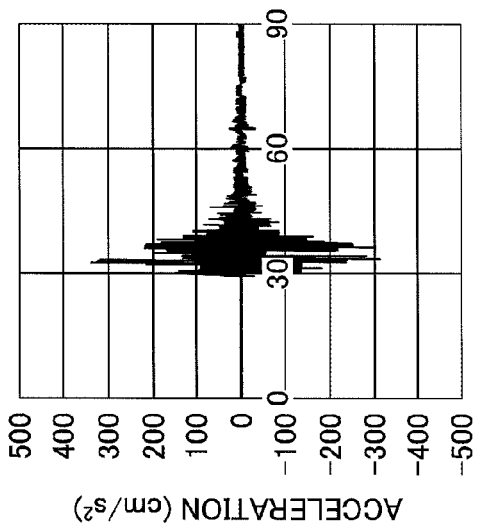
FIG. 8A, FIG. 8B, and FIG. 8C are waveform diagrams showing an input experimental earthquake wave in the X-direction, Y-direction, and Z-direction, respectively.
Figure 8B:
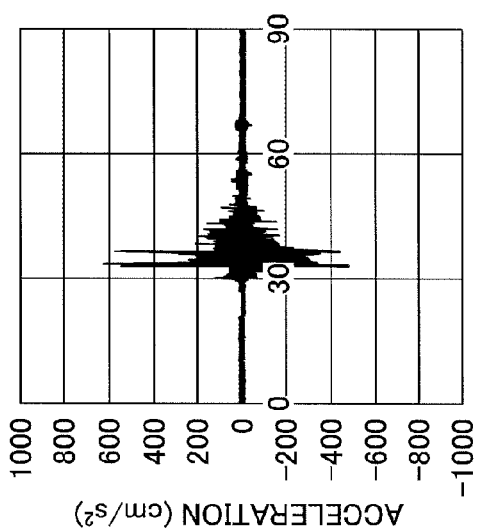
Figure 8A:
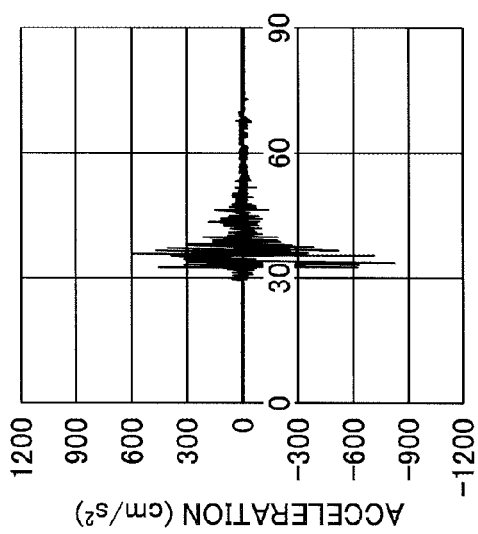

Dimensions of the base: X=6 m, Y=4 m (concrete floor dimensions: X=6.5 m, Y=4 m)
Evaluation was made with the concrete floor on which female screws are anchored was put on the base (table).
Maximum loading mass: 80 tonf
Maximum displacement: X=±300 mm, Y=±150 mm, Z=±100 mm (35 tonf)
Maximum acceleration: X=1 g, Y=3 g, Z=1 g (35 tonf)
Degrees of freedom: 6 degrees (B) INSTALLATION OBJECT Sample Machine Weight of a printer (main part) and peripheral devices: 1,530 kg (C) EXPERIMENTAL EARTHQUAKE WAVE The earthquake wave (which is called Kobe wave) observed at the Kobe Marine Observatories of the Great Hanshin Earthquake (the earthquake at the southern part of Hyogo Prefecture of Japan in 1995) was adjusted to the input experimental earthquake wave for each condition. FIGS. 8A, 8B and 8C show the input experimental earthquake waves in the X-direction, Y-direction and Z-direction, respectively.

(D) CRITERIA OF JUDGMENT

In Example-2, the following (D1) and (D2) were made into the criteria of judgment.
(D1) No overturning of an installation object.
(D2) The amount of movement of an installation object is less than the reference amount of 500 mm.
The criteria of judgment of the (D1) and (D2) above were determined based on the values from "Report of Earthquake-proof Experimental Results of Copying Machines, Multifunction Peripherals and Digital Printers" supplied by the earthquake safety measures WG of Japan Business Machine and Information System Industries Association (JBMIA).

(E) RESULTS OF ASSESSMENT

FIG. 9 shows a list of measurement results the amounts of movement of the soleplate and the installation object (system) after the input of the experimental earthquake wave, and the amounts of movement of the installation object (system) during the input of the experimental earthquake wave. FIG. 10 shows the amounts of movement of the installation object (system) after the input of the experimental earthquake wave. Overturning of the installation object was not caused on all the conditions (Nos. 1-11).

In the following, the "anchor-less" model means the composition of the earthquake resisting apparatus of the present disclosure as shown in FIG. 3. The "anchor" model means the conventional composition which does not include a rubber sheet 3 and wherein fixing brackets 5 and 6 are fixed to the installation floor 10 with anchor bolts. The "jack-up" model is the composition which does not include a rubber sheet 3, fixing brackets 5 and 6, and fixtures 4, 7-9, and wherein movement of the installation object is restricted only by friction of adjuster receptacles 22.

As shown in FIG. 9 and FIG. 10, the anchor-less model and the anchor model satisfied the judgment criterion (D2) that the amount of movement of the installation object is less than the reference amount of 500 mm even when the XY-earthquake wave with the seismic intensity of level 7 was given. The jack-up model satisfied the judgment criterion (D2) that the amount of movement of the installation object is less than the reference amount of 500 mm when the XYZ-earthquake wave with the seismic intensity of level 6 high was given.

(F) ACCELERATION

Figure 11A:
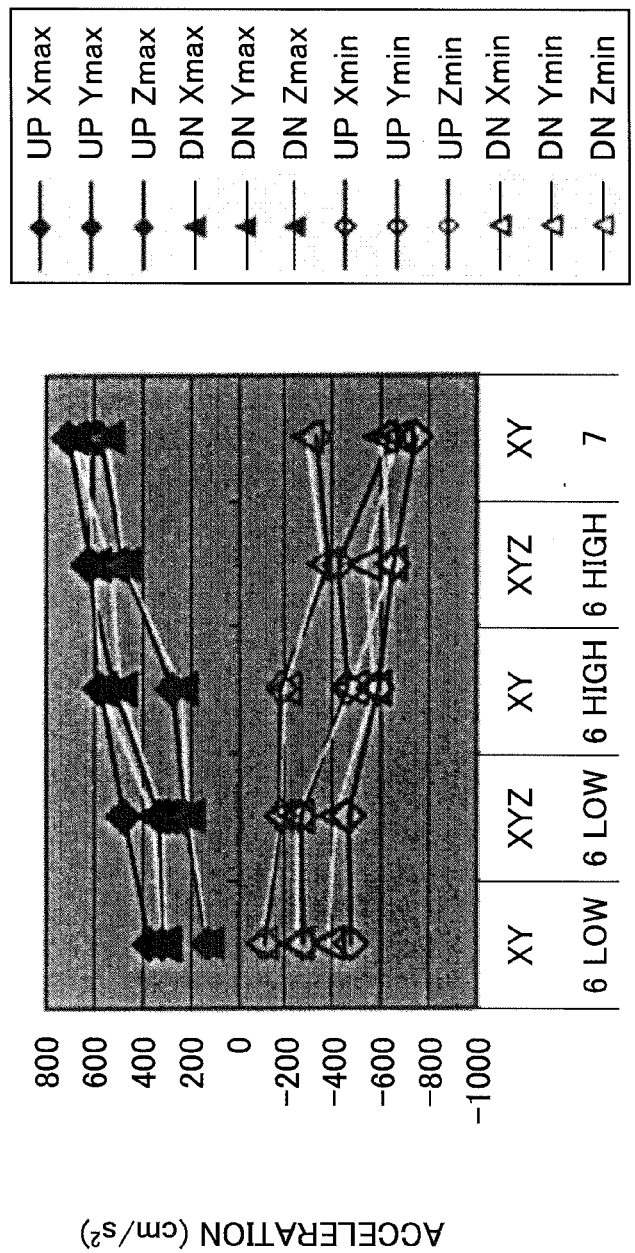
FIG. 11A, FIG. 11B, and FIG. 11C are diagrams showing measurement results of the accelerations of an anchor-less model, an anchor model, and a jack-up model, respectively.
Figure 11B:
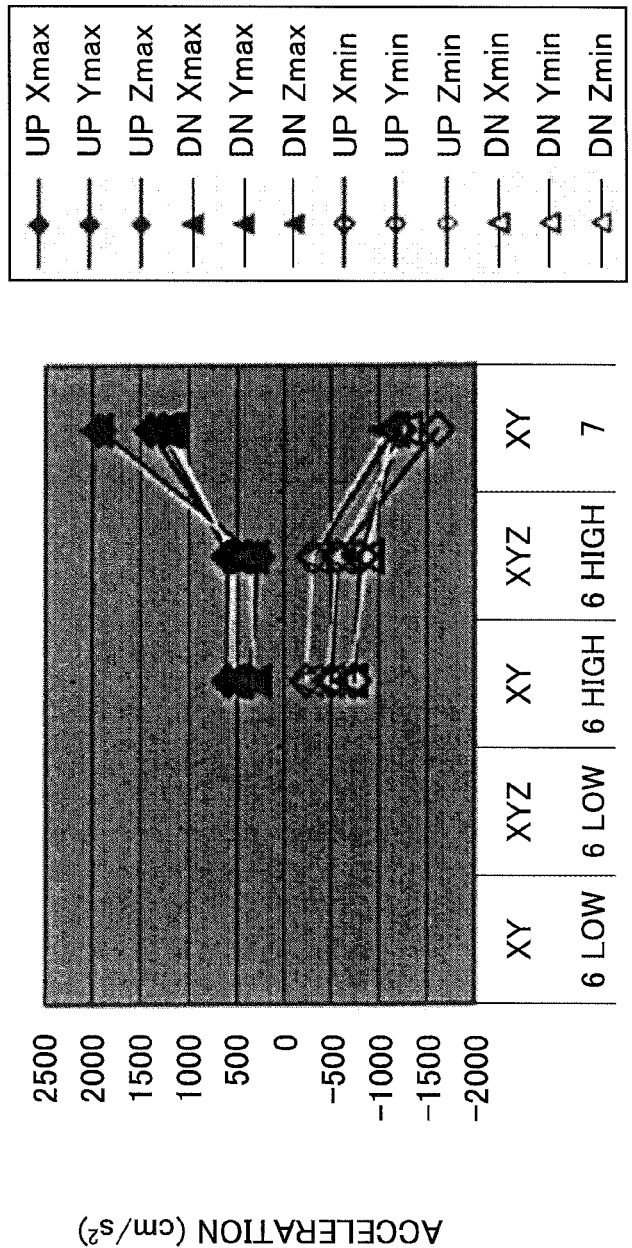
Figure 11C:
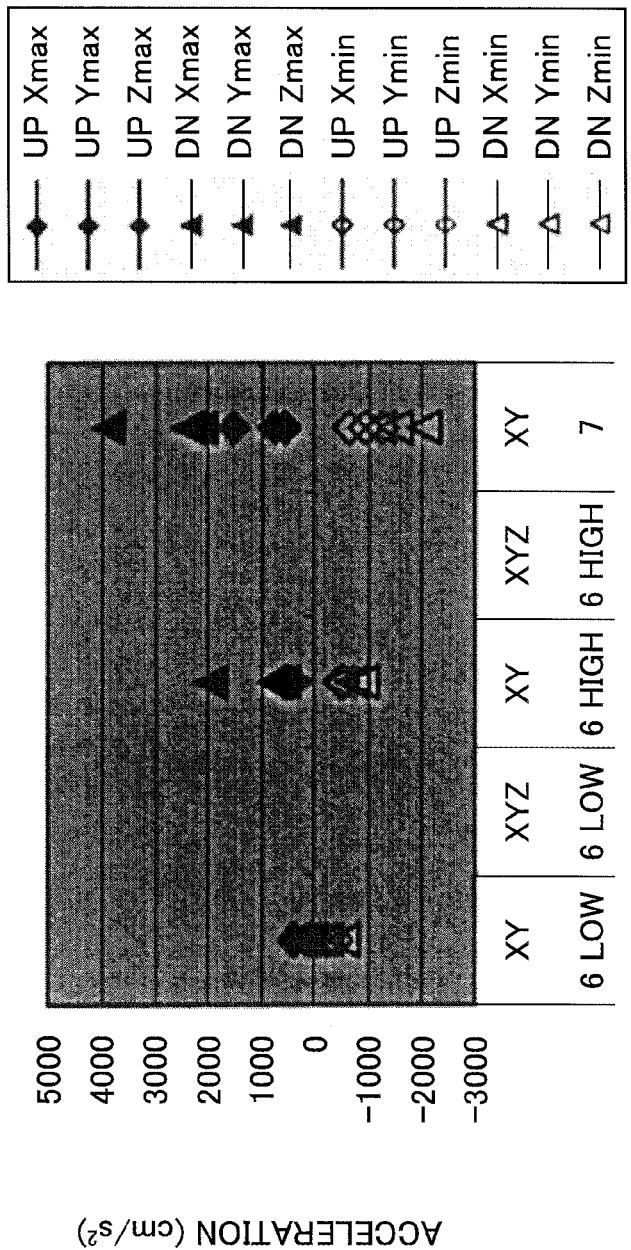

The accelerometer was disposed at each of the upper part and the lower part of the main part of the earthquake resisting apparatus, and the measurement of acceleration was performed. FIGS. 11A, 11B and 11C show measurement results of the minimum and maximum accelerations of the anchor-less model, the anchor model and the jack-up model, respectively. As is apparent from FIGS. 11A-11C, the higher the level of the seismic intensity, the larger the absolute value of the acceleration.

(G) CONCLUSIONS

The following points were confirmed as a result of the assessment which has been made based on the judgment criteria (D1) and (D2).
(1) The anchor-less model showed an earthquake-proof effect to the XY earthquake wave with the seismic intensity level 7.
(2) Only the main part of the anchor model showed the earthquake-proof effect to the XY earthquake wave with the seismic intensity level 7.
(3) The jack-up model showed the earthquake-proof effect to the XY earthquake wave with the seismic intensity level 6 high.

As shown in the results of the Comparative Example, Example-1, and Example-2, it was confirmed that the coefficient of static friction can be increased for each installation floor by using the rubber sheet. It was confirmed that, if the coefficient of static friction is increased to 0.7 or more, the amount of movement of the installation object and the soleplate when the experimental earthquake wave with the seismic intensity of level 6 high was input can be prevented from exceeding the reference amount of 500 mm or more.

As described above, the coefficient of static friction is varied depending on the surface roughness of the two contact members (the movement limiting member and the floor surface), the surface irregularities, the temperature of the environment, the presence of inclusion of a lubricating member, etc. Hence, taking into consideration the friction between the movement limiting member and the installation surface, it is necessary to select an appropriate movement limiting member that allows the coefficient of static friction to be larger than a predetermined value.

According to the present disclosure, it is possible to prevent movement and overturning of the installation object, installed on the floor surface, in case of an earthquake.

The present application is based upon and claims the benefit of priority of Japanese Patent Application No. 2012-005877, filed on Jan. 16, 2012, and Japanese Patent Application No. 2012-241667, filed on Nov. 1, 2012, the contents of which are incorporated herein by reference in their entirety.

What is claimed is:

1. An earthquake resisting apparatus which is installed between an installation object and an installation floor when the installation object is installed on the installation floor, comprising:
    a load transmitting member which is a metal plate member on which the installation object is mounted and has a surface area larger than an installation area of the installation object;
    a movement limiting member which is a plate member or sheet member arranged between the load transmitting member and the installation floor, the movement limiting member bonded to the load transmitting member and having a coefficient of static friction between the movement limiting member and the installation floor when a load acts on the installation object in a horizontal direction in a state in which the installation object is fixed to the load transmitting member, in which the coefficient is larger than or equal to a predetermined value; and
    a fastening part which connects the installation object and the earthquake resisting apparatus,
    wherein the fastening part is disposed outside of a periphery of the installation area of the installation object.

2. The earthquake resisting apparatus according to claim 1, wherein the movement limiting member is formed of a rubber sheet.

3. The earthquake resisting apparatus according to claim 1, wherein the coefficient of static friction is larger than or equal to 0.7.

4. The earthquake resisting apparatus according to claim 1, wherein the load transmitting member is formed of an iron plate.

5. The earthquake resisting apparatus according to claim 1, wherein the movement limiting member is arranged to cover a whole surface of the load transmitting member.

6. The earthquake resisting apparatus according to claim 1, wherein the fastening part comprises a projection screw secured to the load transmitting member, and a connecting tool configured to connect the projection screw and a leg or a main body of the installation object.

7. The earthquake resisting apparatus according to claim 1, wherein the fastening part comprises a screw hole configured to penetrate the load transmitting member or the load transmitting member and the movement limiting member, and a connecting tool configured to connect the screw hole and a leg or a main body of the installation object.

8. The earthquake resisting apparatus according to claim 1, wherein a corresponding number of fastening parts for a number of legs of the installation object are arranged, and the fastening parts and the legs are connected together respectively.

9. The earthquake resisting apparatus according to claim 1, wherein the installation object is able to be divided into pieces, and the installation object pieces are able to be coupled together to form the installation object.

10. The earthquake resisting apparatus according to claim 1, wherein the installation object is an image forming device which is installed on the installation floor so that a height of a top surface of the image forming device from the installation floor satisfies predetermined level surface requirements.

11. The earthquake resisting apparatus according to claim 1, wherein the load transmitting member consists essentially of metal.

12. An earthquake resisting apparatus which is installed between an installation object and an installation floor when the installation object is installed on the installation floor, comprising:
    a load transmitting member which is a metal plate member on which the installation object is mounted and has a surface area larger than an installation area of the installation object, the load transmitting member being in a form of a single layer structure;

a movement limiting member which is a plate member or sheet member arranged between the load transmitting member and the installation floor, the movement limiting member bonded to the load transmitting member and having a coefficient of static friction between the movement limiting member and the installation floor when a load acts on the installation object in a horizontal direction in a state in which the installation object is fixed to the load transmitting member, in which the coefficient is larger than or equal to a predetermined value; and a fastening part which connects the installation object and the earthquake resisting apparatus, wherein the fastening part is disposed outside of a periphery of the installation area of the installation object.

* * * * *